United States Patent
Jakobsen et al.

(10) Patent No.: US 11,757,657 B2
(45) Date of Patent: Sep. 12, 2023

(54) METHOD FOR PROVIDING A DIGITAL SIGNATURE TO A MESSAGE

(71) Applicant: SEPIOR APS, Aarhus C (DK)

(72) Inventors: Thomas Pelle Jakobsen, Maslet (DK); Ivan Bjerre Damgard, Abyhoj (DK); Michael Bæksvang Ostergaard, Hasselager (DK); Jesper Buus Nielsen, Aarhus C (DK)

(73) Assignee: SEPIOR APS, Aarhus (DK)

( * ) Notice: Subject to any disclaimer, the term of this patent is extended or adjusted under 35 U.S.C. 154(b) by 191 days.

(21) Appl. No.: 17/434,143

(22) PCT Filed: Feb. 7, 2020

(86) PCT No.: PCT/EP2020/053101
§ 371 (c)(1),
(2) Date: Aug. 26, 2021

(87) PCT Pub. No.: WO2020/177977
PCT Pub. Date: Sep. 10, 2020

(65) Prior Publication Data
US 2022/0150076 A1    May 12, 2022

(30) Foreign Application Priority Data
Mar. 5, 2019   (EP) .................................. 19160731

(51) Int. Cl.
*H04L 29/06*    (2006.01)
*G06F 21/00*    (2013.01)
(Continued)

(52) U.S. Cl.
CPC ............ *H04L 9/3252* (2013.01); *H04L 9/085* (2013.01); *H04L 9/0869* (2013.01); *H04L 9/3066* (2013.01)

(58) Field of Classification Search
None
See application file for complete search history.

(56) References Cited

U.S. PATENT DOCUMENTS

| 9,191,210 B2 * | 11/2015 | Nagai ........................ H04L 9/32 |
| 2015/0188713 A1 | 7/2015 | Rombouts et al. |
| 2020/0353167 A1 * | 11/2020 | Vivek ................... G06F 21/121 |

FOREIGN PATENT DOCUMENTS

WO    2015160839 A1    10/2015

OTHER PUBLICATIONS

International Search Report with Written Opinion from PCT Application No. PCT/EP2020/053101, dated Apr. 14, 2020.
(Continued)

*Primary Examiner* — Lisa C Lewis
(74) *Attorney, Agent, or Firm* — WORKMAN NYDEGGER

(57) ABSTRACT

A method for providing a digital signature to a message, M, in accordance with a digital signature algorithm (DSA) or an elliptic curve digital signature algorithm (ECDSA) is disclosed. A secret key, x, is generated as a random secret sharing [x] among at least two parties, such as among at least three parties. Random secret sharings, [a] and [k], are generated among the at least two parties and [w]=[a][k], $R=g^k$ and $W=R^a$ are computed and their correctness verified. [w] is verified by checking whether or not $g^w=W$. The message, M, is signed by generating a sharing, [s], among the at least two parties, using at least M, [w], R and [x].

10 Claims, 7 Drawing Sheets

(51) Int. Cl.
  *H04L 9/32*    (2006.01)
  *H04L 9/08*    (2006.01)
  *H04L 9/30*    (2006.01)

(56) References Cited

OTHER PUBLICATIONS

Extended Search Report from corresponding EP Application No. EP19160731, dated Jul. 19, 2019.
International Preliminary Report on Patentability from PCT Application No. PCT/EP2020/053101, dated Nov. 27, 2020.
Gennaro et al., "Robust Threshold DSS Signatures," Information and Computation, vol. 164, Jan. 10, 2001, pp. 54-84.

* cited by examiner

METHOD FOR PROVIDING A DIGITAL SIGNATURE TO A MESSAGE

FIELD OF THE INVENTION

The present invention relates to a method for providing a digital signature to a message in accordance with a digital signature algorithm (DSA) or an elliptic curve digital signature algorithm (ECDSA). According to the invention, the digital signature is generated using a multiparty threshold DSA or ECDSA protocol.

BACKGROUND OF THE INVENTION

Digital signatures may be used for ensuring integrity of transmitted data online, for authentication of data and/or entities online, etc. By using secret signature keys which are generated as secret sharings among a number of parties, each party holding a share of the secret signature key, instead of allowing a single party to hold the entire secret signature key, the risk of the signature system being compromised is reduced. Such a scheme is sometimes referred to as a 'multiparty signature scheme'. In multiparty signature schemes it may be possible to generate a digital signature, even though some of the parties are unavailable, corrupt or compromised. The maximum number of corrupted parties that can be tolerated without violating security is sometimes referred to as the scheme's security threshold, and may be denoted 't'.

Digital signature algorithms have previously been used for generating digital signatures. One example is the DSA standard. It devises a signature scheme parameterised by a cyclic group G of prime order q and generator g∈G as well as two functions H: $\{0,1\}^* \to Z_q$ and F: $G \to Z_q$. The secret signature key x is chosen at random from $Z_q$ and the corresponding public verification key is computed as $y=g^x$. To sign a message M one first chooses a random nonce $k \in Z_q$ and then computes the signature as (r, s), where $r=F(g^k)$ and $s=k^{-1} \cdot (H(M)+r \cdot x)$. Given the public verification key y and a signature (r, s) one can verify the signature by computing $m=H(M)$ and checking that $r=F(g^{m/s} \cdot y^{r/s})$.

Another example is the ECDSA standard which defines signature schemes that essentially work in the same way as DSA, but where G is instead generated by a point g on an elliptic curve. Digital signature algorithms applying elliptic curve cryptography, normally referred to as elliptic curve digital signature algorithms or ECDSAs, have previously been used for generating digital signatures. Such algorithms are known to be suitable for providing reliable digital signatures.

It is common to use multiplicative notation when describing DSA, but additive notation for ECDSA. Here we will use multiplicative notation even though our method can be applied to both DSA and ECDSA. I.e., for elements a, b in the group G we will use a·b, or just ab, to denote the group operation applied to the two elements. Computations on elements in the field $Z_q$ are assumed to take place within the field, i.e., when we write r·x or m/s reduction modulo q is implicit.

WO 2015/160839 A1 discloses a system and a method for generation of elliptic curve digital signature algorithm (ECDSA) based digital signatures in a distributed manner, where a secret-share protocol is initialized between a client and a set of n servers to share a set of shares of a private key among the set of n servers. The set of servers initializes a protocol to generate a digital signature on a message using the set of shares of the private key without reconstructing or revealing the private key. A threshold, t, of up to n/2 (i.e. t≤n/2) of the n servers can be maliciously and completely corrupted or compromised, without compromising the confidentiality of the private key or the correctness of the generated signature.

The system and method disclosed in WO 2015/160839 A1 requires a significant number of rounds of interaction in order to generate the digital signature. Furthermore, the system and method requires high processing power and communication bandwidth.

Rosario Gennaro, et al.: "Robust Threshold DSS Signatures", Information and Computation, vol. 164, pages 54-84 (2001), discloses a method for providing digital signatures using a multiparty threshold signature scheme. The protocol described in this article applies polynomial interpolation, and is robust and unforgeable against up to t malicious adversaries when the number of parties, n, is larger than or equal to 3t+1. Thus, in order to tolerate 1 malicious adversary, the number of parties should be at least 4. Furthermore, the method requires a significant number of rounds of interaction in order to generate the digital signature.

DESCRIPTION OF THE INVENTION

It is an object of embodiments of the invention to provide a method for providing a multiparty DSA or ECDSA based digital signature in which the number of rounds of interaction required in order to generate the digital signature is reduced without compromising confidentiality.

It is a further object of embodiments of the invention to provide a method for providing a multiparty DSA or ECDSA based digital signature in which requirements to processing power is reduced without compromising confidentiality.

It is an even further object of embodiments of the invention to provide a method for providing a multiparty DSA or ECDSA based digital signature in which requirements to communication bandwidth is reduced without compromising confidentiality.

It is an even further object of embodiments of the invention to provide a method for providing a multiparty DSA or ECDSA based digital signature which can tolerate up to t of the parties being maliciously corrupted, where t>n/3.

The invention provides a method for providing a digital signature to a message, M, in accordance with a digital signature algorithm DSA or an elliptic curve digital signature algorithm ECDSA, the method comprising the steps of:

providing a generator, g, for a cyclic group, G, of order q, where g∈G, a function, F, and a function, H, where g, G, F and H are specified by the DSA or ECDSA, generating a secret key, x, as a random secret sharing [x] among at least two parties, generating random secret sharings, [a] and [k], among the at least two parties and computing [w]=[a] [k], computing a value, R, as $R=g^k$, without revealing k, ensuring that R is correct by verifying that $R=g^k$ is computed from at least t+1 shares of [k] originating from honest parties, computing an authenticator, W, as $W=g^{ak}$, by computing $R^a$, without revealing a or k, ensuring that W is correct by verifying that $W=R^a$ is computed from at least t+1 shares of [a] originating from honest parties, verifying [w] by checking whether or not $g^w=W$, and signing the message, M, by computing $[k^{-1}]=[a]\cdot w^{-1}$, computing $[x\cdot k^{-1}]=[x]\cdot[k^{-1}]$, and generating a sharing, [s], among the at least two parties, as a function of M, R, $[k^{-1}]$ and $[x\cdot k^{-1}]$.

Thus, the method of the invention is a method for providing a DSA based or an ECDSA based digital signature to a message, M. The digital signature applied in accordance with the method of the invention may, e.g., be used for ensuring authenticity of a sender, for ensuring integrity of transmitted data, e.g. during online financial transactions, etc.

According to the method of the invention, a generator, g, for a cyclic group, G, of order q, a function, F, and a function, H, are initially provided. The generator, g, is an element of the cyclic group, G, i.e. $g \in G$. The cyclic group, G, the generator g, and the functions, F and H, are all specified by the DSA or ECDSA, and thereby these are defined once it has been determined which specific DSA or ECDSA is to be used.

Next, a secret key, [x], is generated as a random secret sharing among at least two parties, such as among at least three parties. In the present context the term 'secret sharing' should be interpreted to mean that the secret key is distributed among the at least two parties in such a manner that each of the parties holds a share of the secret key, and none of the parties is in the possession of the entire secret key. Accordingly, the method of the invention applies a multiparty system. Thereby none of the parties constitutes a single point of trust, and several of the parties, i.e. at least t+1 parties, need to collude maliciously in order to gain access to the entire secret key. This improves the security of the system, in particular in terms of confidentiality.

An example of a secret sharing scheme is additive sharing. A secret x is said to be additively shared among n parties $P_1, P_2, \ldots, P_n$ when each party $P_i$ holds a random share $x_i$ such that $x=x_1+x_2+\ldots+x_n$. Additive sharing has threshold t=n−1 since all n shares are required to reconstruct the secret, i.e., reconstructing x requires the collaboration of all n parties, while possession of up to all but one share does not allow reconstruction of x. Another example is Shamir's sharing scheme. Here a secret x is shared when each party $P_i$ holds as its share the value f(i) for a random polynomial f subject to f(0)=x. The degree of a Shamir sharing is defined as the degree of the polynomial f. If this degree is t then any t+1 parties can recombine their shares into the secret using polynomial interpolation, whereas the shares held by any subset of t or less parties reveal nothing about x.

In the present context the term 'random secret sharing' should be interpreted to be a secret sharing where the shares are randomly chosen, such that the shared secret is also a random value. For an additive sharing, this means that the shares are completely random. For a Shamir sharing with threshold t it means that the shares are points on a random degree t polynomial.

Throughout this disclosure, letters arranged in square brackets, '[ ]', represent sharings of an element among a number of parties. The same letters without the square brackets represent the entire element. Thus, for instance 'x' represents the entire secret key, and [x] represents the secret sharing of the secret key, x.

It is possible to carry out computation on secret sharings without revealing the secrets. This is the subject of the research field 'secure multiparty computation'. For most kinds of secret sharing the parties can easily compute the sum of two secret sharings, i.e., given [x] and [y] they can compute the sharing [x+y] without revealing x or y. Similarly, if all parties agree on a public constant c, they can easily compute from c and [x] the sharing [c·x] without revealing x. We will use the notation [x]+[y] and c·[x] for these operations.

It is also possible to compute from [x] and [y] the product [xy]. Doing so without revealing x and y, when up to a given security threshold (t) of the parties may collude maliciously, is possible, but is often difficult and inefficient. For this reason, for two random sharings [x] and [y] a 'weak' notion of multiplication is sometimes used. A weak multiplication guarantees confidentiality in the sense that no information about x and y leaks as long as at most t parties are malicious. But weak multiplication does not guarantee correctness of the result. Rather, it only computes the correct result [xy] if all parties behave correctly. A single malicious party could, e.g., spoil the result such that the resulting sharing [z] is not a sharing of xy. In the following, for simplicity, we use the notation [z]=[x][y] to denote weak multiplication unless otherwise stated.

Weak multiplication can e.g. be constructed for Shamir sharings as long as the security threshold t satisfies t<n/2. For larger thresholds, i.e., up to the maximal threshold t=n−1, weak multiplication can e.g. be obtained for additive sharings by combining an additive homomorphic encryption scheme such as Paillier's encryption scheme with so-called zero knowledge proofs. Examples of such constructions of weak multiplication can be found in the secure multiparty computation research literature.

The parties may, e.g., be in the form of separate servers, which may be physically separated from each other. The parties may preferably be separate or independent in the sense that information being available to one party is unavailable to the other parties. It is, however, not ruled out that some of the parties share some information, as long as no subset of t+1 or more parties is in the possession of all information.

Next, random secret sharings, [a] and [k], are generated among the at least two parties. Accordingly, each of the at least two parties holds a share of a and a share of k. Furthermore, [w]=[a][k] is computed, also as a secret sharing among the at least two parties. This could be performed by each of the at least two parties computing a share of w from its shares of a and k. Furthermore, [w] may be 'opened', i.e. the secret w revealed to each of the at least two parties. This could, e.g., be obtained by each of the at least two parties revealing its share of w to each of the other parties. It should be noted that [w] can be opened without opening [a] and/or [k], i.e. while keeping the values of a as well as k secret.

Next, a value, R, is computed as $R=g^k$, without revealing k. This could, e.g., include each of the at least two parties computing a share of R, based on their share of k. This will be described in further detail below. As an alternative, R may be computed in another manner, as long as it is ensured that k is not revealed. However, R may be revealed to each of the at least two parties. Note that due to the commonly accepted cryptographic assumption known as the 'discrete log' assumption, on which standard DSA/ECDSA is also based, it is not possible to deduce any information about k by seeing the value $R=g^k$.

It is further ensured that R is correct. In the present context this should be interpreted to mean that R equals $g^k$ where k is the unique value k defined by the secret sharing [k]. The step of ensuring that R is correct is performed by verifying that $R=g^k$ is computed from at least t+1 shares of [k] originating from honest parties, where t denotes the threshold of the signature scheme, i.e. up to t malicious, corrupt, dishonest or unavailable parties can be tolerated. Thus, when ensuring the correctness of R, the honesty of the participating parties is investigated, and it is only concluded that R is correct, if it can be demonstrated that at least t+1 participating parties are honest. This will be described in further detail below.

If it turns out that R is incorrect, the signing process may be aborted. For instance, each honest party may be guaranteed to either (1) obtain the value $R=g^k$ or (2) to output abort at this point. I.e., even if up to t parties are corrupted, the remaining n-t parties will either obtain $R=g^k$ or abort. This will be described in further detail below.

Next, an authenticator, W, is computed as $W=g^{ak}$. This is done by computing $R^a$ instead of by computing $g^{ak}$ directly, and without revealing a or k. This may be done in the same manner as the manner in which R was computed, except R is used as a base instead of g. Also in this case, it is ensured that W is correct by verifying that $W=R^a$ is computed from at least t+1 shares of [a] originating from honest parties, and the signing process may be aborted if this is not the case.

Thus, at this stage in the process, a correct $R=g^k$ and a correct $W=g^{ak}$ have been computed, while the values k and a remain secret.

Next, [w] is verified by checking whether or not $g^w=W$. This may include opening [w] to each party. Note that since weak multiplication of sharings was used to compute [w], w only equals the product ak if all parties were honest and followed the protocol until this point. Since $W=g^{ak}$ is already known to be correct, verifying that $g^w=W$ ensures that w=ak. At this point W, g and w are known by all parties, and thereby any party can verify the correctness of its value w in this manner. Moreover, this can be done without revealing a, as well as without revealing k.

Thus, at this stage in the process, it has been ensured that a correct value of w has been computed by each honest party among the at least two parties.

All of the steps described above may be performed without knowledge of the message, M, to be signed. Accordingly, these steps may be performed in a pre-processing process, e.g. during non-peak periods. This may level loads on processing equipment and increase the number of transactions which can be performed during peak periods, and it may reduce response time from a message, M, is presented and until the signature on M is computed.

Finally, the message, M, is signed by computing $[k^{-1}]=[a] \cdot w^{-1}$, computing $[x \cdot k^{-1}]=[x] \cdot [k^{-1}]$, and generating a sharing, [s], among the at least two parties, as a function of M, R, $[k^{-1}]$ and $[x \cdot k^{-1}]$.

A DSA or ECDSA digital signature of M normally consists of a pair, (r, s), where $r=F(g^k)$ and $s=k^{-1}(H(M)+rx)$. The pair, (r, s), can be revealed and verified using the public key y. The generated sharing, [s], is a sharing of the latter part, s, of the signature pair. The first part of the pair, r, may be generated as r=F(R), where F is one of the functions which were initially provided and specified by the ECDSA. The sharing, [s] is generated as follows: First a sharing of the inversion of k is computed as $[k^{-1}]=w^{-1}[a]$. Since w has been verified to be equal to ak, this yields a correct sharing of $k^{-1}$, because $w^{-1}[a]=[aw^{-1}]=[a(ak)^{-1}]=[(aa^{-1})k^{-1}]=[k^{-1}]$. Furthermore, the sharing $[x \cdot k^{-1}]$ is computed as $[x] \cdot [k^{-1}]$. The sharing [s] can then e.g. be computed by first computing $[A]=H(M)[k^{-1}]$, $[B]=[k^{-1}][x]$, and finally computing $[s]=[A]+r[B]$.

Furthermore, in the method according to the invention, abort is allowed in the case that there is any doubt regarding the correctness of the process, i.e. termination guarantee is not provided, even though this is a requirement in many prior art methods. Such doubt could, e.g., be due to one or more of the parties being compromised or malicious, or it could simply be due to package loss during communication among the parties. Aborting the process would simply result in the process being restarted in order to attempt to provide a correct signature.

Signing methods where termination guarantee is provided usually achieve the termination guarantee by assuming a synchronous network, i.e. a network which guarantees an upper limit on package delay. Applying such methods using an open communication network, such as the Internet, being inherently asynchronous, requires that each party must be provided with a local clock, and if a party does not receive an expected message within a certain fixed timeout, according to the local clock, it will simply treat the sender as corrupt.

This results in a dilemma. If the timeout is small, then there is a high risk that the package delays, which occur frequently on the Internet, will quickly cause more parties to be treated as corrupt than what the protocol can tolerate, e.g., more than n/2 or n/3 of the n parties, and consequently the secret signing key may leak. To avoid this, the timeout must be set very high. But this has the drawback that it allows a single malicious party to introduce a very high latency in the system by intentionally delaying each message that he sends to the other parties, i.e., he can hold back the message until close until the timeout happens. The method according to this invention avoids this dilemma by allowing the protocol to abort. This allows the use of quite small timeouts, yielding only a small overall latency in the system. This is possible because the method is designed to ensure that the worst thing that can happen, even when all messages are delayed, is that the protocol aborts, and not, as in some prior disclosed methods, that the secret signing key leaks.

The step of computing a value, R, may comprise the steps of:
  each of the at least two parties computing a share, $R_j$, of the value, R, as $R_j=g^{k\_j}$, and distributing the share to each of the other parties, and
  computing the value, R, from the shares, $R_j$, and
the step of ensuring that R is correct may comprise the step of:
  each of the parties checking that R is correct, based on the shares, $R_j$, received from the other parties.

Recall that each party, $P_j$, holds a share, $k_j$, of the secret k. According to this embodiment, the value, R, is computed by the at least two parties in the following manner. Each of the at least two parties computes a share, $R_j$, of R, where $R_j$ denotes the share of R which is computed by party j. $R_j$ is computed as $R_j=g^{k\_j}$, where k_j denotes the share of [k] which is held by party j. Thus, each party calculates a share of $R_j$, based on its own share of [k].

Each of the at least two parties then distributes its share, $R_j$, of R to each of the other parties, i.e. the shares, $R_j$, are revealed. However, due to the discrete log assumption, the shares k_j remain secret, and hence the secret nonce k remains secret.

The value, R, is then computed from the revealed shares, $R_j$. This could, e.g., include interpolating 'in the exponent' the shares, $R_j$. For instance, the value, R, may be computed by the at least two parties and/or it may be computed centrally. In the present context the term 'interpolating in the exponent' should be interpreted to mean polynomial interpolation where a secret 'in the exponent' is reconstructed, for instance calculating $g^k$ from $g^{k\_1}$, $g^{k\_2}$, etc.

Finally, each of the at least two parties checks that R is correct, based on the shares, $R_j$, which were received from the other parties.

According to one embodiment of the method, the shares may be Shamir shares, and there are at least three parties (i.e., n≥3) and the security threshold t satisfies t<n/2. In this embodiment, each of the at least three parties may verify that R is correct by checking that each of the shares, $R_j$, received from the other parties is consistent with a degree t polynomial, $f$, that is uniquely defined by the first t+1 shares. This can be done, e.g., by comparing each of the shares $R_{t+2}$, $R_{t+3}$, . . . , $R_n$ to the expected share which can be computed from the first t+1 shares $R_1, R_2, \ldots, R_{t+1}$ using e.g. Lagrange interpolation in the exponent. If in all cases the received share equals the expected share, then it can be concluded that all received shares, $R_j$, are correct. This can be concluded since it is known that at least t+1 of the shares, are received from honest parties and hence are correct. If any party finds that some of the shares, are missing or are inconsistent with the polynomial determined by the first t+1 received shares, then the party may abort the protocol.

According to an alternative embodiment of the method, the shares may be additive shares, and the security threshold may be up to t=n−1. In this embodiment the share $g^{k\_j}$ of each party $P_i$ may include a zero knowledge proof, e.g., a non-interactive zero-knowledge proof, whereby $P_i$ proves to the other parties that the share $R_i$ was correctly computed, without revealing any information about $k_i$. In this alternative embodiment, verifying correctness of R may include that a party that receives a share $R_j$ from another party verifies the zero knowledge proof and aborts if the proof is invalid.

According to one embodiment, the correctness of R may be ensured in the following manner. Assume that there are three participating parties, n=3, and that one compromised or unavailable party can be tolerated, i.e. t=1. In this case a correct value of R can be computed from shares, $R_j$, originating from two or more honest parties. Each of the three participating parties may then computes its share of R, based on their respective shares of k, and distribute the computed share of R to each of the other two parties, as described above. Each party will then be in the possession of three shares of R, i.e. the share which was computed by itself and the two shares received from the other two participating parties. If all three parties are honest, then R can be correctly computed from any combination of two of these shares. Accordingly, the parties compute R based on any possible combination of two of the available shares, in this example amounting to three combinations, i.e. $(R_1,R_2)$, $(R_1,R_3)$, and $(R_2,R_3)$. If all three combinations result in the same value of R, then it can be concluded that all three parties are honest, and that R is correct. If the value of R computed based on at least one of the combinations differs from the value of R computed based on any of the other combinations, it can be concluded that at least one of the parties is dishonest. However, it can not be determined which of the parties is dishonest, and therefore it is not possible to decide which of the computed values of R is correct. In this case it is simply determined that R is incorrect, and the signing process may be aborted. This might delay the signing process, but no secrets are revealed.

The step of computing the value, R, and the step of checking that R is correct may be performed in a reversed order, i.e. the parties may check that the received shares, $R_j$, are correct before computing the value, R. In this case the value, R, may be computed only if it is found to be correct.

The step of computing a value, R, and the step of computing an authenticator, W, may be performed using the same protocol. For instance, the step of computing an authenticator, W, may be performed essentially in the manner described above relating to the value, R, but by using R as a base instead of g. Thus, in this case each of the at least two parties computes a share, $W_j$, of the authenticator, W, as $W_j=R^{a\_j}$, and distributes the share to each of the other parties, the authenticator, W, is computed from the shares, $W_j$, and each of the parties checks that W is correct, based on the shares, $W_j$, received from the other parties, e.g. in the manner described above.

The method may further comprise the step of aborting the signing process in the case that it is revealed that R or W is incorrect. Thereby it is ensured that the secret key is not revealed to a malicious party. However, in the case that the signing process is aborted, it can be proved that it is safe to restart the process in order to try again to obtain a valid signature.

The method may further comprise the step of aborting the signing process in the case that the step of verifying w reveals that $g^w \neq W$. If it turns out that $g^w \neq W$, then it can be concluded that weak, and consequently a valid signature can not be obtained based on [w]. Attempting to compute and reveal a signature value, s, in this case could potentially harm confidentiality by revealing information about the secret key, x, to a malicious party. Therefore, if this is the case, then the signing process is aborted, similarly to the situation described above, and the signing process may be restarted.

The step of signing a message, M, may be performed by opening [w] and computing $[s]=mw^{-1}[a]+rw^{-1}[a][x]+[d]+m[e]$, where r=F(R), m=H(M), and [d] and [e] are random sharings of zero (so-called "blinder sharings").

With some kinds of secret sharing schemes, once a product [ax]=[a][x] has been computed, it is not safe to open up the sharing [ax], since the shares of [ax] may reveal too much information about the secrets a and x.

This is e.g. the case in a first embodiment of our method, where the shares are Shamir shares, and where the parties' shares of [ax] are obtained by each party multiplying its shares of [a] and [x]. In this case the shares of [ax] are no longer random and may leak information about a or x when opening [ax]. To avoid this, the parties first compute a sharing of zero [0] that is known to have random shares, and instead open [ax]+[0]. Adding [0] does not change the result, but ensures that the value ax is the only information revealed when opening [ax].

So [s] is first computed as $mw^{-1}[a]+rw^{-1}[a][x]$. Note that since w is known to be correct at this point, and assuming that [a][x] is correct, this implies that $[s]=[k^{-1}(m+rx)]$, i.e., [s] is then a sharing of the correct signature value s as defined by DSA or ECDSA. But before opening up [s], a zero sharing [d] is added, i.e., [s]+[d] is opened. Adding d to s does not change the value of s, since d=0.

Given that correctness of w is enforced, as explained above, it can in some embodiments be mathematically proved that revealing the signature (r, s) as computed above does not leak anything more about the secret key x than a correctly computed signature, even in the case where the multiplication [a][x] is a weak multiplication that may not be correct. The only thing that happens if [a][x] is incorrect is that the resulting value (r, s) will not be a valid signature. This can be determined by each party by simply verifying the signature (r, s) using the message M and the public verification key y. If invalid, the parties may restart the signing process.

In some embodiments, opening [s]+[d] can be proved to be secure, but the proof assumes that the honest parties initially agree on the message M to sign. If they disagree on M, unintended information about the secret key x may leak. Therefore, in some embodiments, such as a first embodiment described herein, the parties may instead compute and open [s]+[d]+m·[e] where both [d] and [e] are random sharings of zero, and where m=H(M). In these embodiments, opening this sharing can be shown to be secure even if the honest parties do not all use the same value M. If they agree on M, [d]+m·[e] will turn into a zero sharing that ensures that the result [s] can be opened without revealing information about x. Conversely, if some of the parties hold different values of M, then adding [d]+m·[e] to [s] turns [s] into a completely random sharing which makes the protocol abort, but without leaking any information about x. Thereby we achieve the property that the parties do not have to first ensure that they use the same value of M before they open [s]. This may be important in practice, since this means that the parties do not have to spend an additional round of interaction to ensure that they agree on the value of M before they open [s].

In an alternative embodiment of the method, the shares may be additive shares and an additive homomorphic encryption scheme, such as Paillier's encryption scheme, is used to implement the multiplication [ax]=[a][x]. Here it may be necessary in order to be able to securely reveal the shares of a product [ax]=[a][x] without leaking information about a or x, to include zero-knowledge proofs, e.g., non-interactive zero-knowledge proofs, in the process of computing [ax]. Including such zero-knowledge proofs in the process, e.g., when Paillier encryption is used, is a well-known technique that can be applied by persons skilled in the art.

At least the steps of generating a secret key, x, generating random secret sharings, [a] and [k], computing a value, R, and computing an authenticator, W, may be performed by pre-processing, prior to generation of the message, M. According to this embodiment, some of the steps, e.g. including generating a key pair ([x], y), computing R and W, ensuring correctness of R or W, generating zero sharings [d] and [e], computing the sharing [w], opening [w], verifying that $g^w=W$, and/or computing [ax]=[a][x] may be performed before the message, M, to be signed is known to the parties. As described above, this reduces the number of steps to be performed, and thereby the processing requirements and response time, at the time where the digital signature is provided.

Many kinds of secret sharing, such as e.g. Shamir secret sharing, has the following property: Given two sharings, e.g. [a] and [x], a sharing of the sum of the two secrets, [a+x], can be computed without any interaction between the parties. Furthermore, if all parties know a given public value c, the parties can compute a sharing of the product [c·x] without interaction. Such secret sharing schemes are called 'linear' secret sharing schemes.

According to some embodiments of the present invention where such linear secret sharing is used, by generating [x], [a], y, R, W, [ax] and w, and by verifying correctness of R and w, in a pre-processing stage, prior to the knowledge of the message M to be signed, then once M becomes known to the parties, the parties can generate r and [s] without any interaction with each other. This is because by using the sharings and values already generated and verified in the pre-processing, r can be computed locally by each party as r=F(R) and furthermore, [s] can be computed only by addition of sharings and multiplication of sharings with public constants.

Furthermore, according to some embodiments, by performing some steps by pre-processing, once M is known to the parties, the final signature (r, s) can be revealed to a receiving party in a single round of interaction where each party sends R and its share of [s] to the receiving party.

Furthermore, according to some embodiments, by performing some steps by pre-processing, once M becomes known to the parties, the final signature (r, s) can be revealed to a receiving party in a single round of interaction where only some of the parties send their share of [s] to the receiving party. For example, in a first embodiment, [s] is a degree 2t Shamir sharing, and hence it is sufficient that 2t+1 parties send their shares to the receiving party in a single round of interaction.

According to some embodiments, where linear secret sharing is used, by performing additional pre-processing steps, given M, the final signature (r, s) can be revealed to a receiving party in a single round of interaction where only t+1 of the parties send R and their share of [s] to the receiving party. For example, in some embodiments where [ax] is a degree 2t Shamir sharing, the degree of [ax] can be reduced to t in a pre-processing step using standard techniques known from the field of secure multiparty computation. By doing this, the degree of [s] also becomes t, and hence s can be reconstructed by the receiving party based only on t+1 shares of [s].

Furthermore, according to an embodiment of the invention, additional pre-processing steps may be performed to ensure that the sharing [ax] is a correct sharing of the value ax. This can be done with standard techniques from the field of secure multiparty computation. By doing this, the property is achieved, that if the process does not abort during the pre-processing steps, then a certain number of honest parties, e.g., 2t+1 or t+1 honest parties, can be guaranteed to be able to open up a valid signature (r, s), even if up to t malicious parties try to prevent the opening of a valid signature.

Simplifying the communication like this, e.g., by minimising the number of interaction rounds, that are required once the message M to be signed is known to the parties, as well as the number of shares needed to reconstruct s, can provide benefits in practical applications of a multiparty signature scheme.

The method may further comprise the step of computing a public key, y, as $y=g^x$, and revealing y to each of the at least two parties. According to this embodiment, a key pair in the form of a secret key, [x], and a public key, $y=g^x$, is generated. This key pair is used for generating the digital signature.

The method may further comprise the step of verifying the signature, using the public key, y. This could, e.g., comprise checking whether or not $r=F(g^{m/s} \cdot y^{r/s})$. Alternatively or additionally, this step may comprise checking whether or not $R^s=g^m \cdot y^r$.

This could, e.g. include each of the at least two parties verifying the correctness of the signature, using the public verification key y. This could, e.g., comprise checking that $R^s=g^m \cdot y^r$. If a party finds this to be the case, the party accepts the signature (r, s) and outputs it as the result. If not, it may abort the signing process.

In another embodiment of the method, it is not the parties themselves, but an external party that should receive the resulting signature (r, s). In this case each party $P_j$ computes R and its share $s_j$ of the secret sharing [s] as described above. Each party then sends R and $s_j$ to the external party. The external party compares all the received values R and aborts if they are not equal. It then computes r=F(R) and computes s from the shares $s_j$ via polynomial interpolation, and verifies using the public key y, that $R^s=g^m \cdot y^r$. If so, he accepts (r, s) as the resulting signature.

The method may further comprise the step of checking correctness of y. According to an embodiment of the invention, this step may comprise the steps of first generating a random sharing [x] and then opening $y=g^x$ and checking correctness of y in the same manner as generating the random sharing [k] and opening and verifying correctness of $R=g^k$.

BRIEF DESCRIPTION OF THE DRAWINGS

The invention will now be described in further detail with reference to the accompanying drawings in which.

DETAILED DESCRIPTION OF THE DRAWINGS

Figure 1:
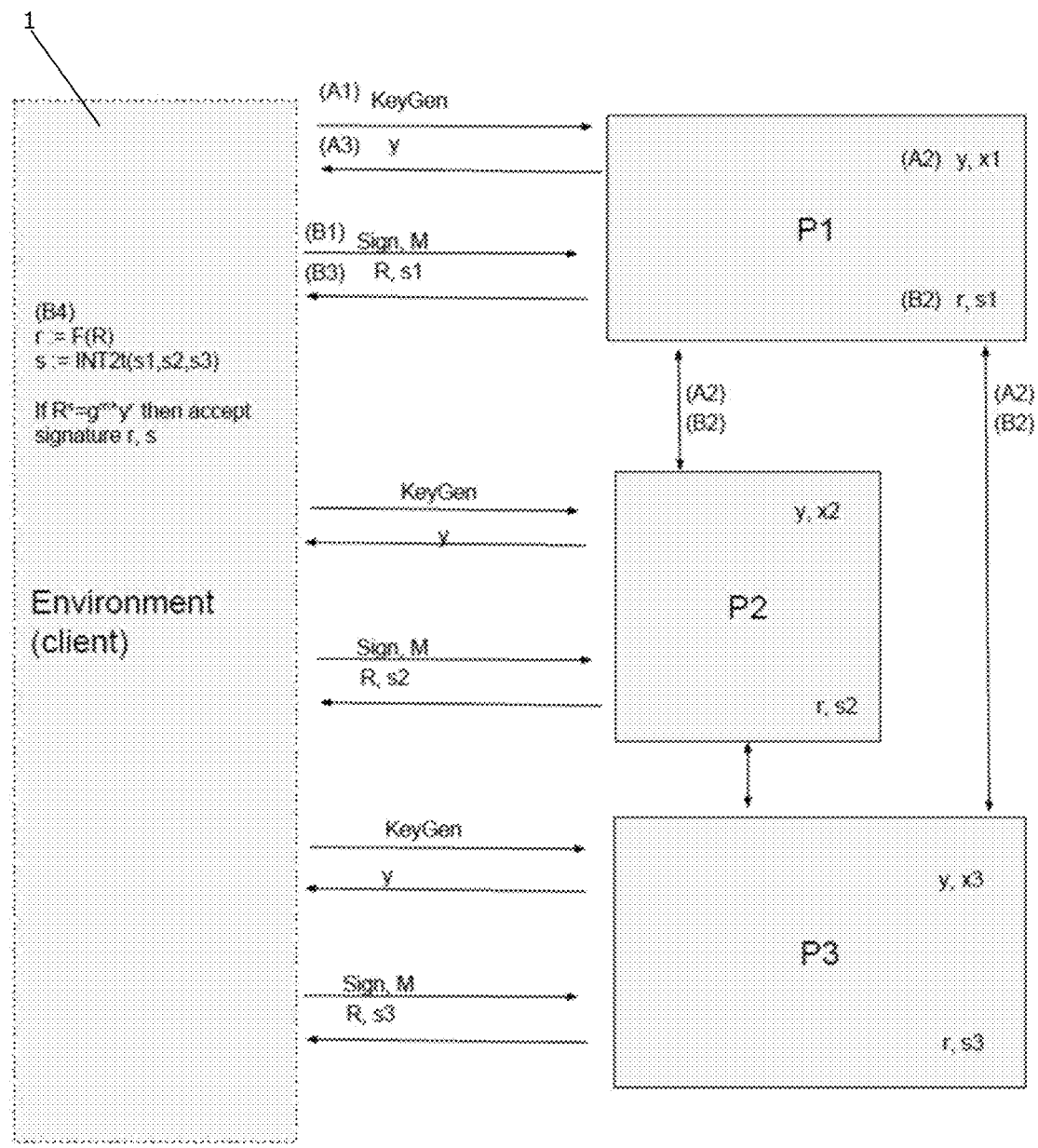
FIG. 1 is a block diagram illustrating key generation and signature generation using a method according to a first embodiment of the invention.

FIG. 1 is a block diagram illustrating key generation and signature generation using a method according to a first embodiment of the invention. The method involves the use of three parties, P1, P2 and P3, being individual or separate in the sense that information being available to one of the parties P1, P2, P3 may not be available to the other parties P1, P2, P3. The parties P1, P2, P3 may, e.g., be in the form of physically separated hardware servers. In this example the security threshold (t) is 1, i.e., if one of the parties P1, P2, P3 is malicious, that party will not be able to learn any information about x or otherwise be able to sign a message M with the secret key x unless the other (honest) parties agree to sign M.

A client 1 sends a request, KeyGen, to each of the parties P1, P2, P3, requesting that the parties P1, P2, P3 generate a key pair, ([x], y), comprising a secret key, [x], and a public key, y. The client 1 is arranged in the environment surrounding a system including the three parties P1, P2, P3, i.e. the client does not form part of the system which is to generate the key and the signature.

In response to receipt of the request KeyGen, the three parties P1, P2, P3 generate a secret key, [x], as a random secret sharing among the three parties P1, P2, P3. This may include several rounds of interaction between the parties P1, P2, P3, and it may, e.g., be performed in the manner described below with reference to FIG. 2. As a result, each of the parties P1, P2, P3 holds a share, x1, x2, x3 of the secret key x, but none of the parties P1, P2, P3 is in the possession of the entire secret key x.

The three parties P1, P2, P3 further compute a public key, y, as $y=g^x$. The public key, y, is made public in the sense that each of the parties P1, P2, P3 is in the possession of y, and in the sense that y is communicated to the client 1 by each of the parties P1, P2, P3. Thus, $y=g^x$ is made public or 'opened', but x remains secret.

In the case that none of the parties P1, P2, P3 is malicious or corrupted, the public key, y, communicated to the client 1 by each of the parties P1, P2, P3 will be the same, i.e. the client 1 will receive three identical version of y from the three parties P1, P2, P3. Thus, if the client 1 receives three identical versions of y, it can conclude that none of the parties P1, P2, P3 is malicious or corrupted, i.e. that all of the parties P1, P2, P3 have acted correctly so far. On the other hand, in the case that the three versions of y received from the three parties P1, P2, P3 differ from each other, it can be concluded that at least one of the parties P1, P2 or P3 is malicious or corrupted. In that case the client 1 causes the process to abort.

When the key pair, ([x], y), has been generated, a signature process, which applies the generated key pair, ([x], y), is initiated by the client 1 sending a request, Sign, and a message, M, to be signed to each of the parties, P1, P2, P3.

In response to receipt of the request, Sign, and the message, M, the parties P1, P2, P3 engage in a signature generation process which may require several rounds of interaction among the parties and in which each party P1, P2, P3 applies its share x1, x2, x3 of [x] without revealing the share x1, x2, x3 to the other parties. At the end of the signature generation process, each party P1, P2, P3 is in the possession of a value R and a share, s1, s2, s3 of [s]. The signature generation process could, e.g., be performed in the manner described below with reference to FIG. 3.

Each of the parties P1, P2, P3 then returns R and its share, s1, s2 or s3, of [s] to the client 1. In response thereto the client 1 computes s from the received shares s1, s2, s3, e.g. using interpolation. Furthermore, the client 1 computes r=F(R), and may accept (r, s) as a valid signature only if identical versions of R are received from at least two of the three parties P1, P2, P3. Furthermore, an additional verification check, e.g. validating that $R^s=g^m \cdot y^r$, may be performed by the client 1, in order for it to accept the signature, (r, s) as a valid signature.

Figure 2:
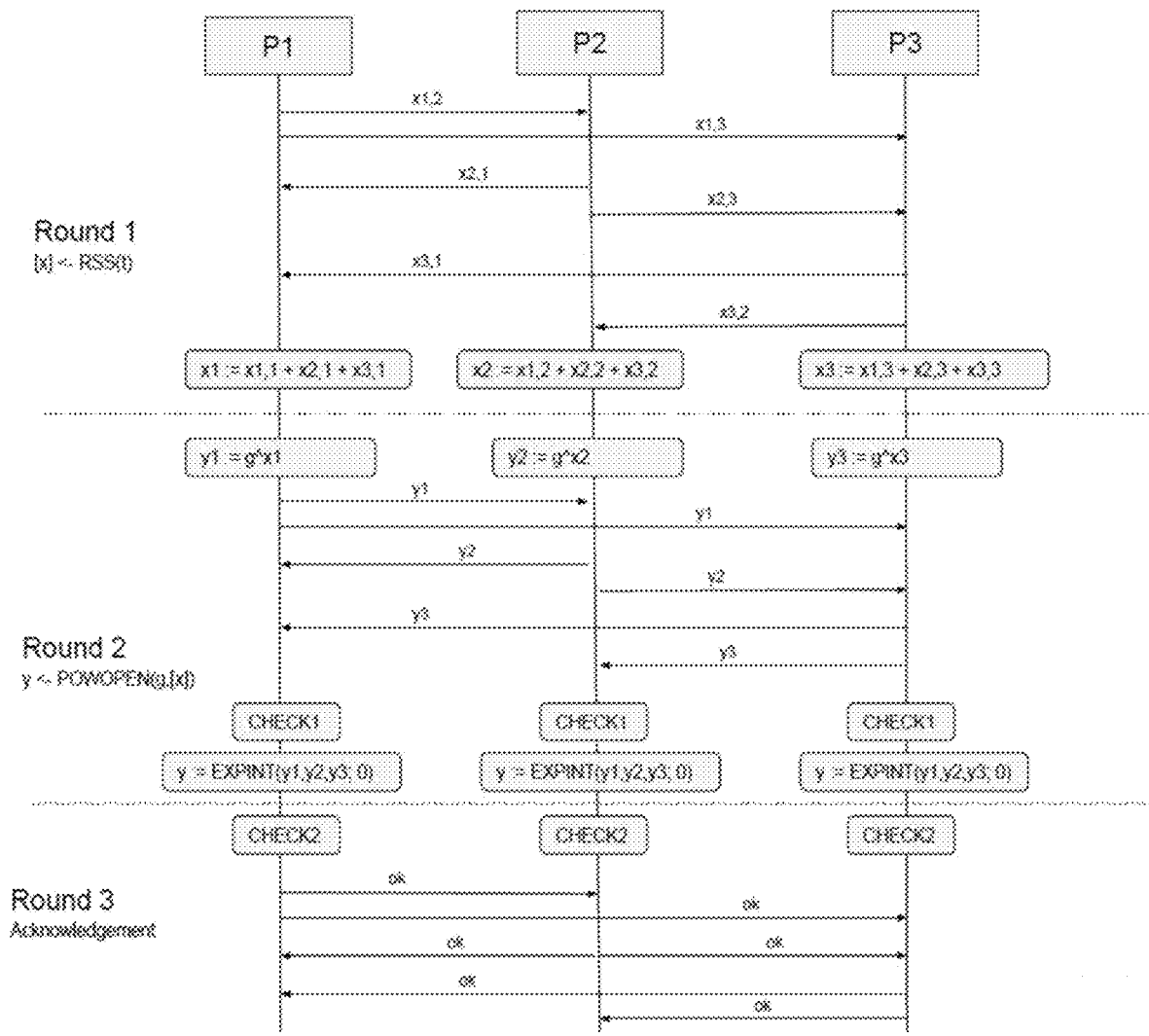
FIG. 2 is a block diagram illustrating key generation using a method according to a second embodiment of the invention, FIG. 3, including

FIG. 2 is a block diagram illustrating key generation using a method according to a second embodiment of the invention. The key generation illustrated in FIG. 2 may, e.g., be applied as part of the method illustrated in FIG. 1.

In the embodiment illustrated in FIG. 2, three parties P1, P2, P3 cooperate in computing a key pair ([x], y), where [x] is a secret key in the form of a secret sharing among the three parties P1, P2, P3, and y is a public key. According to this embodiment the shares are Shamir secret shares, and the security threshold is one, i.e., t=1.

In a first round of interactions between the parties P1, P2, P3, the secret key, [x], is generated as a random degree t Shamir secret sharing among the parties P1, P2, P3. To this end, each party P1, P2, P3 generates three random values, one for itself and one for each of the other parties P1, P2, P3, and forwards the generated values to the respective other parties P1, P2, P3. Thus, party P1 generates value x1,1 and keeps it for itself, generates value x1,2 and forwards it to party P2, and generates value x1,3 and forwards it to party P3. Similarly, party P2 generates value x2,1 and forwards it to party P1, generates value x2,2 and keeps it for itself, and generates value x2,3 and forwards it to party P3. Finally, party P3 generates value x3,1 and forwards it to party P1, generates value x3,2 and forwards it to party P2, and generates value x3,3 and keeps it for itself.

Thus, at the end of the first round of interaction among the parties P1, P2, P3, each party P1, P2, P3 is in the possession of three random values, i.e. a value generated by itself and a value received from each of the other parties P1, P2, P3. Based on these three values, each of the parties P1, P2, P3 generates a share, x1, x2, x3, of [x].

In a second round of interaction among the parties P1, P2, P3, the parties P1, P2, P3 compute a public key, y. To this end, each party computes $yi=g^{xi}$, where g is a generator for a cyclic group, G, yi is a value generated by party Pi, and xi is the share of [x] being held by party Pi. Furthermore, each of the parties P1, P2, P3 communicates the value yi to each of the other parties P1, P2, P3. Thus, party P1 computes $y1=g^{x1}$ and communicates y1 to parties P2 and P3, etc. Accordingly, each of the parties P1, P2, P3 is now in the possession of each of the three values, y1, y2 and y3.

Each of the parties P1, P2, P3 then checks that the values yi received from the other two parties are trustworthy. This may, e.g., include performing interpolation in the exponent. In the case that one of the parties P1, P2, P3 concludes that the value yi received from at least one of the other parties is not trustworthy, that party P1, P2, P3 outputs an 'abort' signal, and the signing process is consequently aborted.

In the case that none of the parties P1, P2, P3 outputs an 'abort' as described above, the signing process is allowed to continue, and each of the parties P1, P2, P3 generates a public key, y, based on the values y1, y2 and y3, and using interpolation. According to the DSA/ECDSA standard, y=1 is an illegal public key, and hence the process should be aborted if this is the case. It is noted that if the protocol aborts, it may be restarted, resulting in another key pair being generated. If it was found that y≠1, each of the parties P1, P2, P3 then forwards an 'OK' signal to each of the other parties P1, P2, P3, as part of a third round of interaction among the parties P1, P2, P3. Each of the parties P1, P2, P3 accepts its own version of y only if it receives an 'OK' signal from each of the other parties P1, P2, P3. Otherwise the signing process will be aborted.

In the case that 'OK' signals are received from the other parties P1, P2, P3 as described above, the public key, y, is output.

Figure 3A:
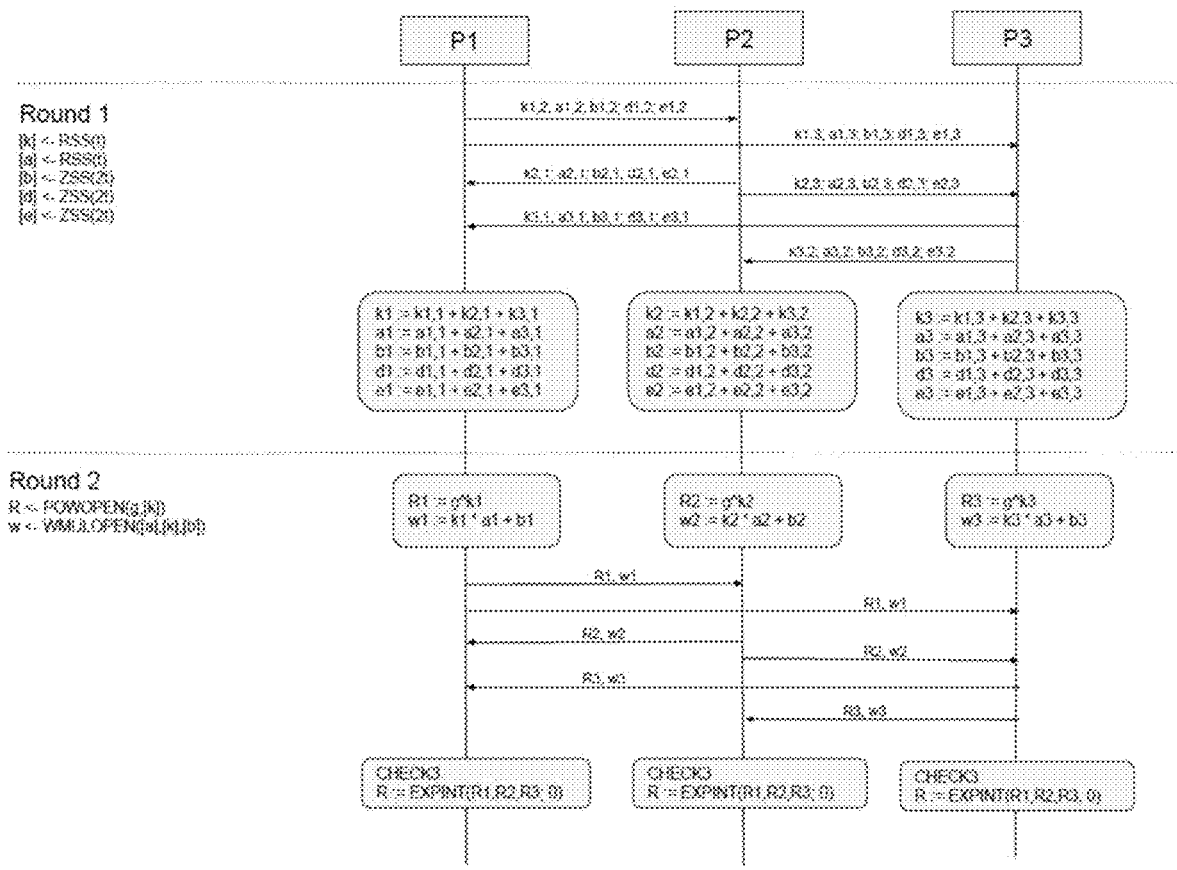
FIGS. 3a and 3b, is a block diagram illustrating signature generation using a method according to a third embodiment of the invention.
Figure 3B:
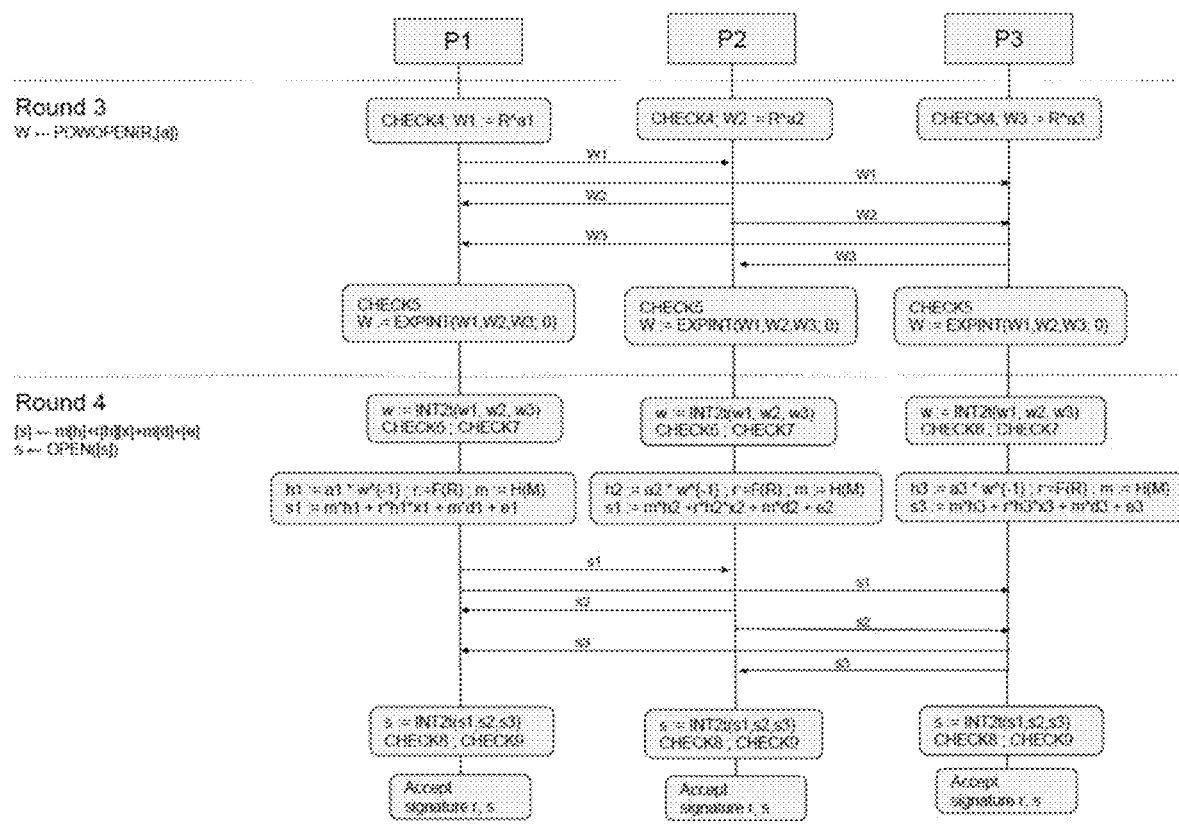

FIG. 3 is a block diagram illustrating signature generation using a method according to a third embodiment of the invention. As in FIG. 2, the secret sharings are Shamir sharings and the security threshold is one (t=1). The process starts in FIG. 3a and continues in FIG. 3b. The signature generation illustrated in FIG. 3 may, e.g., be applied as a part of the method illustrated in FIG. 1.

In the embodiment illustrated in FIG. 3, three parties P1, P2, P3 cooperate in generating a signature (r, s) for a message, M, using a secret key, [x], in the form of a secret sharing among the three parties, P1, P2, P3. The secret key, [x], could, e.g., be generated as a degree t Shamir sharing in the manner described above with reference to FIG. 2.

In a first round of interaction among the parties P1, P2, P3, illustrated in FIG. 3a, the parties generate random degree t secret sharings, [k] and [a]. This is performed essentially in the manner described above with reference to FIG. 2 with regard to the generation of [x]. The parties also generate three random degree 2t zero sharings, [b], [d], and [e], i.e. blinding sharings. Thus, at the end of the first round of interaction among the parties P1, P2, P3, each party P1, P2, P3 holds a share of each of [k], [a], [b], [d] and [e], and none of the parties P1, P2, P3 is in the possession of any information about the secrets a and k.

Next, in a second round of interaction among the parties P1, P2, P3, also illustrated in FIG. 3a, each of the parties P1, P2, P3 computes a value Ri as $Ri=g^{ki}$, where g is a generator for a cyclic group, G, Ri is the value computed by party Pi, and ki is the share of [k] being held by party Pi. Thus, party P1 computes $R1=g^{k1}$, party P2 computes $R2=g^{k2}$, and party P3 computes $R3=g^{k3}$.

Furthermore, each of the parties P1, P2, P3 computes a value wi as wi=ki·ai+bi, where wi is the value computed by party Pi, and ki, ai and bi are the shares of [k], [a] and [b], respectively, being held by party Pi. Thus, party P1 computes w1=k1·a1+b1, party P2 computes w2=k2·a2+b2, and party P3 computes w3=k3·a3+b3. The shares w1, w2, w3 held by the parties form a degree 2t Shamir sharing [w] where w equals ak if all parties performed the prescribed actions correctly.

Each of the parties then reveals the computed values Ri and wi to each of the other parties. Thus, each of the parties P1, P2, P3 is now in the possession of each of the three values R1, R2 and R3, and each of the three shares w1, w2 and w3, and accordingly $R=g^k$ and w=k·a+b are now known by each of the parties P1, P2, P3, even though each of k and a remains secret. This may be referred to as 'opening' R and w. The sharing [b] may be referred to as a 'blinder sharing', since adding it to [ak] does not change the secret, but 'blinds' the individual shares of the sharing [ak], thereby making it impossible to derive any information about a or k from seeing the shares of [ak] except the product ak.

At the end of the second round of interaction among the parties P1, P2, P3, each of the parties P1, P2, P3 checks correctness of R. This is done based on the received values R1, R2 and R3, and using interpolation in the exponent. In the case that at least one of the parties P1, P2, P3 finds that R is incorrect, the process is aborted. Otherwise, the process continues.

Next, in a third round of interaction among the parties P1, P2, P3, illustrated in FIG. 3b, each of the parties P1, P2, P3 computes a value, Wi as $Wi=R^{ai}$, where Wi is the value computed by party Pi, and ai is the share of [a] being held by party Pi. Furthermore, each party P1, P2, P3 reveals the computed values Wi to each of the other parties P1, P2, P3. Accordingly, each of the parties P1, P2, P3 is now in the possession of each of the values W1, W2, W3, and by using interpolation in the exponent $W=R^a$ can be computed by each of the parties P1, P2, P3, while the value a remains secret. This may be referred to as 'opening' W.

At the end of the third round of interaction among the parties P1, P2, P3, each of the parties P1, P2, P3 checks correctness of W, based on the received values W1, W2, W3, and using interpolation in the exponent. This is done using the values Wi in the same manner as correctness of R was checked using the values Ri in the second round of interaction. In the case that at least one of the parties P1, P2, P3 finds that W is incorrect, the process is aborted. Otherwise, the process is continued.

Finally, in a fourth round of interaction among the parties P1, P2, P3, each of the parties P1, P2, P3 computes w, based on the values w1, w2 and w3, and using interpolation.

Furthermore, each of the parties P1, P2, P3 verifies w by checking that $W=g^w$. As described above, it is enforced that $W=R^a$ and $R=g^k$. If this was not the case, the process would have aborted previously. It follows from this that $W=g^{ka}$. So by checking that $g^w=W$, it is ensured that w=a·k. It is noted that [w] was computed, not as [a][k], but as [a][k]+[b], but since [b] is a sharing of zero, i.e. [b]=[0], adding [b] makes no difference for this check.

In the case that at least one of the parties P1, P2, P3 finds that $W \neq g^w$, then the signature process is aborted. Otherwise the process is continued, and each of the parties P1, P2, P3 computes a share si of a sharing [s] as:

$$si = m \cdot hi + r \cdot hi \cdot xi + m \cdot di + ei$$

where:

$$hi = ai \cdot w^{-1},$$

$r = F(R)$, where $F$ is a predefined function, and $m = H(M)$, where $M$ is the message to be signed and $H$ is a predefined function.

xi, di and ei are the shares of [x], [d] and [e], respectively, being held by party Pi. When each party computes its share si as described, it means that the parties collectively perform the computation $[s] = m[k^{-1}] + r[k^{-1}][x] + m[d] + [e]$. If all parties performs the actions as prescribed, this results in $[s] = [k^{-1}(m+rx)]$, i.e., $s = k^{-1}(m+rx)$ as required by DSA or ECDSA.

Each of the parties P1, P2, P3 reveals the share si to each of the other parties P1, P2, P3, and each of the parties P1, P2, P3 computes s using interpolation based on the received shares s1, s2, and s3 and then checks correctness of s by verifying the signature on the message M using the public key y, i.e., by checking that $R = g^m \cdot y^r$. If correctness of s is confirmed, the signature (r, s) is accepted as the final signature of the message, M.

Figure 4:
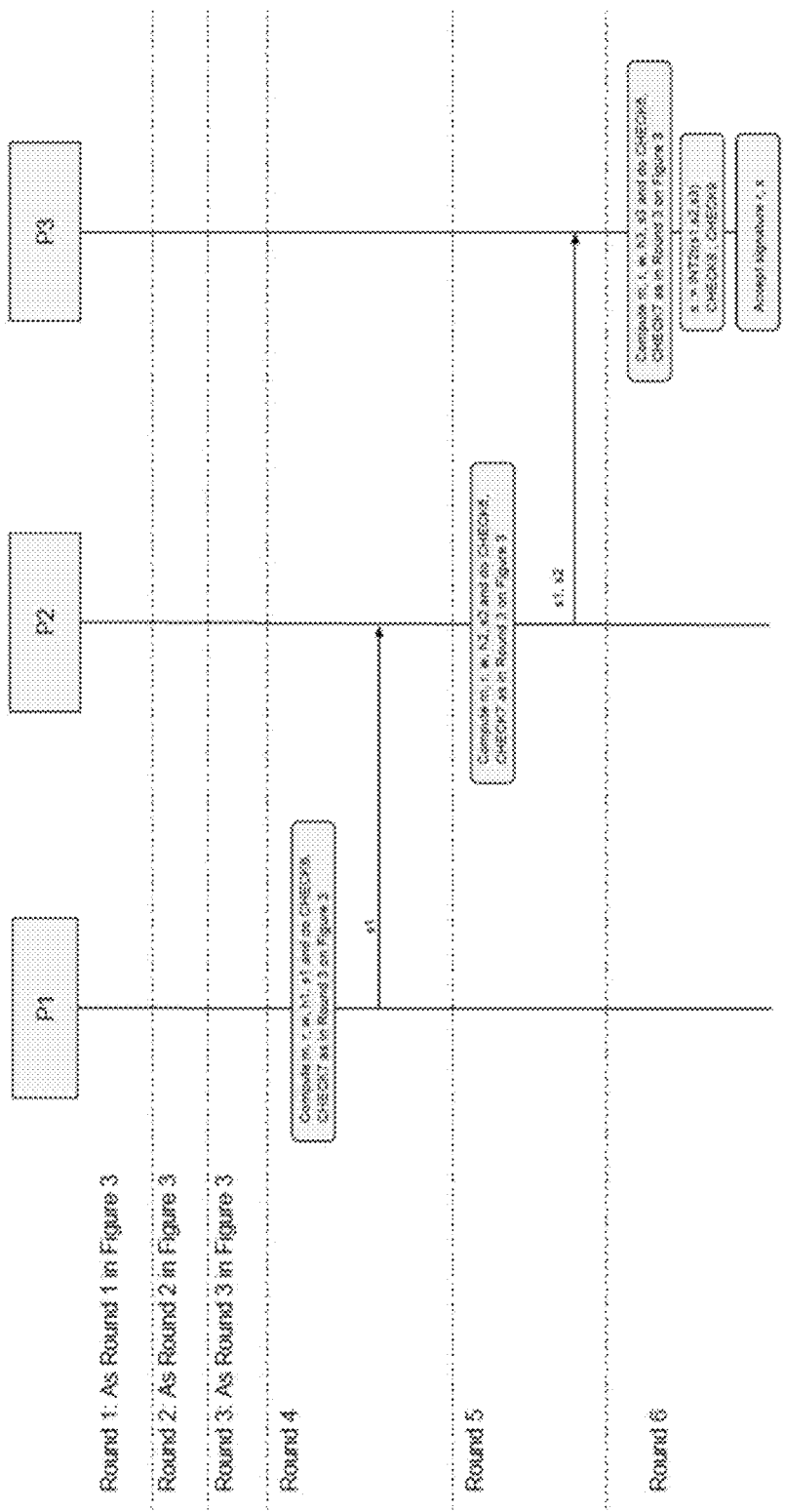
FIG. 4 is a block diagram illustrating signature generation using a method according to a fourth embodiment of the invention.

FIG. 4 is a block diagram illustrating signature generation using a method according to a fourth embodiment of the invention. The process illustrated in FIG. 4 includes six rounds of interaction among three parties P1, P2, P3. The first three rounds of interaction among the parties P1, P2, P3 are identical to the first three rounds of interaction illustrated in FIG. 3 and described above.

In a fourth round of interaction among the parties P1, P2, P3, only party P1 computes s1 in the manner described above with reference to FIG. 3, i.e.:

$$s1 = m \cdot h1 + r \cdot h1 \cdot x1 + m \cdot d1 + e1.$$

P1 then forwards s1 to party P2, and in a fifth round of interaction among the parties P1, P2, P3, party P2 computes s2 in the manner described above with reference to FIG. 3, and forwards s1 and s2 to party P3.

In a sixth round of interaction among the parties P1, P2, P3, party P3 computes s3 in the manner described above with reference to FIG. 3, and computes s based on the three shares s1, s2 and s3, and using interpolation. Party P3 then checks correctness of s, and if s is correct, the signature (r, s) is accepted by party P3 as the resulting signature (r, s) of the message M.

Thus, in the embodiment illustrated in FIG. 4, the signature (r, s) is only received by party P3, whereas each of the parties P1, P2, P3 receives the signature (r, s) in the embodiment illustrated in FIG. 3. An embodiment like this may be practical, since in the online phase, each party P1, P2, P3 needs only send a single message to one party, whereas in the embodiment of FIG. 3, each party has to send a message to each of the other parties.

Figure 5:
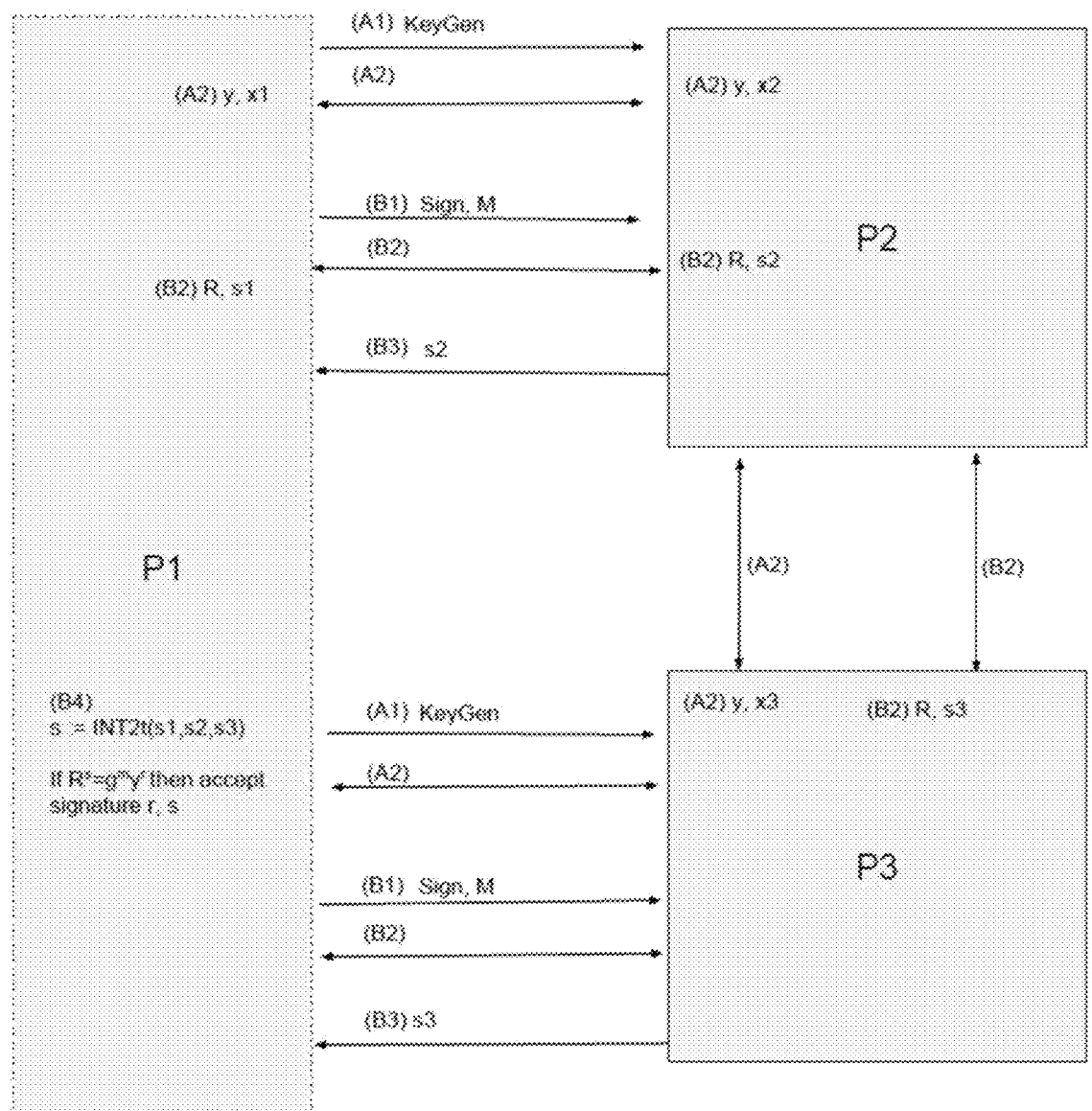
FIG. 5 is a block diagram illustrating key generation and signature generation using a method according to a fifth embodiment of the invention.

FIG. 5 is a block diagram illustrating key generation and signature generation using a method according to a fifth embodiment of the invention. The embodiment illustrated in FIG. 5 is very similar to the embodiment illustrated in FIG. 1, and it will therefore not be described in detail here.

However, in the embodiment illustrated in FIG. 5, the process is initiated by one of the parties, party P1, rather than by an external client. Thus, party P1 performs the steps which are performed by the client in the embodiment of FIG. 1, as well as the steps performed by party P1 in the embodiment of FIG. 1.

Figure 6:
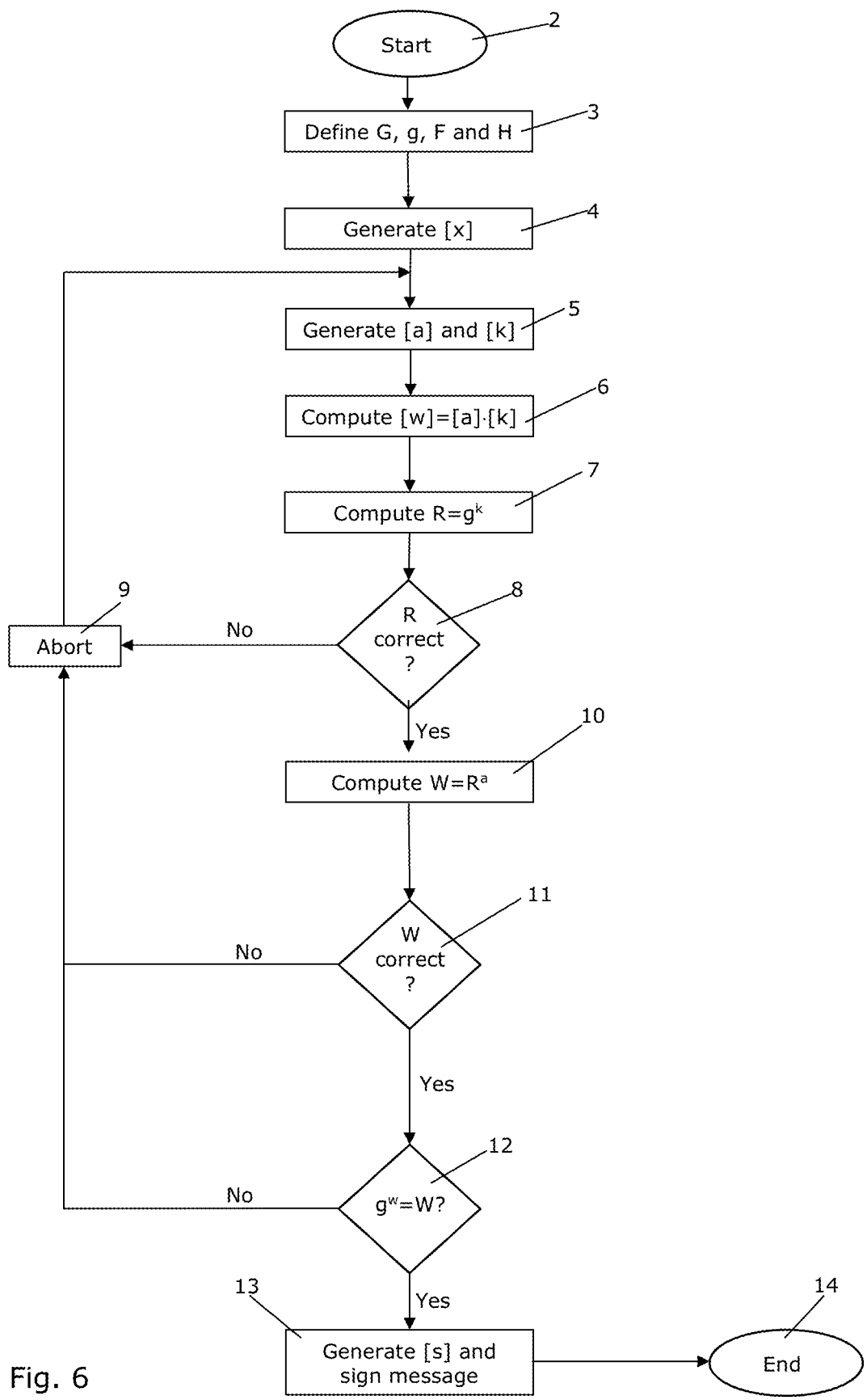
FIG. 6 is a flow chart illustrating a method according to an embodiment of the invention.

FIG. 6 is a flow chart illustrating a method according to an embodiment of the invention. The process is started in step 2. In step 3, a cyclic group, G, and a generator, g, for the cyclic group, G, are defined. Furthermore, functions F and H are defined. G, g, F and H are all specified by a digital signature algorithm (DSA) or an elliptic curve digital signature algorithm (ECDSA) which is to be used for generating the digital signature.

In step 4 a random secret sharing [x] is generated among at least two parties, where x is a secret key.

In step 5 random secret sharings [a] and [k] are generated among the at least two parties.

In step 6 the parties compute $[w] = [a] \cdot [k]$, and in step 7 the parties compute a value, $R = g^k$. R may, e.g., be computed by each of the parties computing a share, as $R_j$, as $R_j = g^{k\_j}$, where $k\_j$ is the share of [k] being held by party j, and computing the value, R, from the shares, $R_j$.

In step 8 it is investigated whether or not R is correct. If this is not the case, the process is forwarded to step 9, where the signing process is aborted, and the process is returned to step 5 in order to generate new secret sharings [a] and [k].

In the case that step 8 reveals that R is correct, the signing process is allowed to continue, and the process is forwarded to step 10, where the parties compute an authenticator, $W = g^{ak}$. This is done by computing $R^a$.

In step 11 it is investigated whether or not W is correct. If this is not the case the process is forwarded to step 9, where the signing process is aborted, and the process is returned to step 5 in order to generate new secret sharings [a] and [k].

In the case that step 11 reveals that W is correct, the process is forwarded to step 12, where it is investigated whether or not $g^w = W$. Since $W = R^a$ and $R = g^k$, then $W = g^{ak}$. Since $w = a \cdot k$, $g^w = W$ if w has been correctly computed. Thus, if it can be verified that $g^w = W$ it can be concluded that w has been correctly computed. Thus, in the case that step 12 reveals that $g^w \neq W$, the process is forwarded to step 9, where the signing process is aborted, and the process returns to step 5 in order to generate new secret sharings [a] and [k].

In the case that it is verified in step 12 that $g^w = W$, the process is forwarded to step 13, where a sharing [s] is generated among the parties, and a signature is applied to the message. Finally, the process is ended in step 14.

The invention claimed is:

1. A method for providing a digital signature to a message, M, in accordance with a digital signature algorithm, DSA, or an elliptic curve digital signature algorithm, ECDSA, the method comprising the steps of:
   providing a generator, g, for a cyclic group, G, of order q, where g∈G, a function, F, and a function, H, where g, G, F and H are specified by the DSA or ECDSA,
   generating a secret key, x, as a random secret sharing [x] among at least two parties,
   generating random secret sharings, [a] and [k], among the at least two parties and computing [w]=[a][k],
   computing a value, R, as $R = g^k$, without revealing k, by performing the steps of:
      each of the at least two parties computing a share, $R_j$, of the value, R, as $R_j = g^{k\_j}$, and distributing the share to each of the other parties, and
      computing the value, R, from the shares, $R_j$,
   ensuring that R is correct by verifying that $R = g^k$ is computed from at least t+1 shares of [k] originating from honest parties, by each of the parties checking that R is correct, based on the shares, $R_j$, received from the other parties, computing an authenticator, W, as $W=g^{ak}$, by computing $R^a$, without revealing a or k, by performing the steps of:
- each of the at least two parties computing a share, $W_j$, of the authenticator, W, as $W_j=R^{a_j}$, and distributing the share to each of the other parties, and
- computing the authenticator, W, from the shares, $W_j$, ensuring that W is correct by verifying that $W=R^a$ is computed from at least t+1 shares of [a] originating from honest parties, by each of the parties checking that W is correct, based on the shares, $W_j$, received from the other parties, verifying [w] by checking whether or not $g^w=W$, and signing the message, M, by computing $[k^{-1}]=[a] \cdot w^{-1}$, computing $[x \cdot k^{-1}]=[x] \cdot [k^{-1}]$, and generating a sharing, [s], among the at least two parties, as a function of M, R, $[k^{-1}]$ and $[x \cdot k^{-1}]$, by computing $[s]=m \cdot w^{-1} \cdot [a] + r \cdot w^{-1} \cdot [a] \cdot [x] + [d]$, where $r=F(R)$, $m=H(M)$, and [d] is a random sharing of zero, where s forms part of a signature pair (r, s).

2. The method according to claim 1, further comprising the step of aborting the signing process in the case that it is revealed that R or W is incorrect.

3. The method according to claim 1, further comprising the step of aborting the signing process in the case that the step of verifying [w] reveals that $g^w \neq W$.

4. The method according to claim 1, wherein the step of signing a message, M, is performed by computing $[s]=m \cdot w^{-1} \cdot [a] + r \cdot w^{-1} \cdot [a] \cdot [x] + [d] + m \cdot [e]$, where $r=F(R)$, $m=H(M)$, and [d] and [e] are random sharings of zero.

5. The method according to claim 1, wherein at least the steps of generating a secret key, x, generating random secret sharings, [a] and [k], computing a value, R, and computing an authenticator, W, are performed by pre-processing, prior to generation of the message, M.

6. The method according to claim 1, further comprising the step of computing a public key, y, as $y=g^x$, and revealing y to each of the at least two parties.

7. The method according to claim 6, further comprising the step of verifying the signature, using the public key, y.

8. The method according to claim 7, wherein the step of verifying the signature comprises checking whether or not $r=F(g^{m/s} \cdot y^{r/s})$.

9. The method according to claim 7, wherein the step of verifying the signature comprises checking whether or not $R^s=g^m \cdot y^r$.

10. The method according to claim 6, further comprising the step of checking correctness of y.

* * * * *

UNITED STATES PATENT AND TRADEMARK OFFICE
CERTIFICATE OF CORRECTION

PATENT NO. : 11,757,657 B2
APPLICATION NO. : 17/434143
DATED : September 12, 2023
INVENTOR(S) : Thomas Pelle Jakobsen et al.

Page 1 of 1

It is certified that error appears in the above-identified patent and that said Letters Patent is hereby corrected as shown below:

In the Specification

Column 10
Line 54, change "$r=F(g^{m/s} \cdot y^{t/s})$" to -- $r=F(g^{m/s} \cdot y^{r/s})$ --

Column 16
Line 41, change "$g^w W$" to -- $g^w=W$ --

Signed and Sealed this
Thirty-first Day of October, 2023

*Katherine Kelly Vidal*

Katherine Kelly Vidal
*Director of the United States Patent and Trademark Office*